United States Patent
Sato

(10) Patent No.: US 6,219,076 B1
(45) Date of Patent: Apr. 17, 2001

(54) IMAGE FORMING APPARATUS HAVING A PHOTOSENSITIVE MEMBER BEARING AN ELECTROSTATIC LATENT IMAGE WHOSE PIXEL DENSITY CAN BE CHANGED

(75) Inventor: Hiroshi Sato, Shizuoka-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,118

(22) Filed: Mar. 30, 1998

(30) Foreign Application Priority Data

Mar. 31, 1997 (JP) .................................................. 9-098474

(51) Int. Cl.$^7$ .................................................. B41J 2/385
(52) U.S. Cl. .................................................. 347/131
(58) Field of Search ........................... 347/131; 399/111, 399/116

(56) References Cited

U.S. PATENT DOCUMENTS

| | | | |
|---|---|---|---|
| 5,529,865 | 6/1996 | Kanbayashi et al. | 430/45 |
| 5,616,442 | * 4/1997 | Kanemaru et al. | 399/116 X |
| 5,765,077 | 6/1998 | Sakurai et al. | 399/176 |
| 5,811,212 | * 9/1998 | Tanaka | 399/116 X |
| 5,818,489 | * 10/1998 | Yoshinago et al. | 347/131 |
| 5,831,657 | * 11/1998 | Sakaue et al. | 347/131 |
| 5,885,737 | * 3/1999 | Tanaka | 399/116 X |

OTHER PUBLICATIONS

Patent Abstract of Japan, vol. 010, No. 177, Jun. 21, 1986, Abstract of JP 61–025165.

Patent Abstract of Japan, vol. 1995, No. 06, Jul. 31, 1995, Abstract of JP 7–061036.

Patent Abstract of Japan, vol. 01996, No. 11, 21 published 11/29/96, Abstract of JP 08–184990.

Patent Abstract of Japan, vol. 1997, No. 07,31 published 7/31/97, Abstract of JP 9–062030.

* cited by examiner

*Primary Examiner*—Fred L. Braun
(74) *Attorney, Agent, or Firm*—Fitzpatrick, Cella, Harper & Scinto

(57) ABSTRACT

An image forming apparatus provided with an electrostatic latent image bearing member, a charger for charging the surface of the electrostatic latent image bearing member, an exposure device for exposing the surface of the electrostatic latent image bearing member to light on the basis of image information, a developer device for visualizing the electrostatic latent image by a developer, a pixel density changing device for changing over the pixel density of the electrostatic latent image to a different set value, and an exposure intensity changing device for changing over the exposure intensity of the exposure means in conformity with the setting of the pixel density. The electrostatic latent image bearing member is 2000 (V·cm$^2$/μJ) or greater in sensitivity. The specification also describes a cartridge removably mountable on an image forming apparatus having the function of changing over the pixel density of an image formed on a recording material, the cartridge having a photosensitive member of which the sensitivity is 2000 (V·cm$^2$/μJ) or greater.

4 Claims, 5 Drawing Sheets

3a
3b } 3
3c

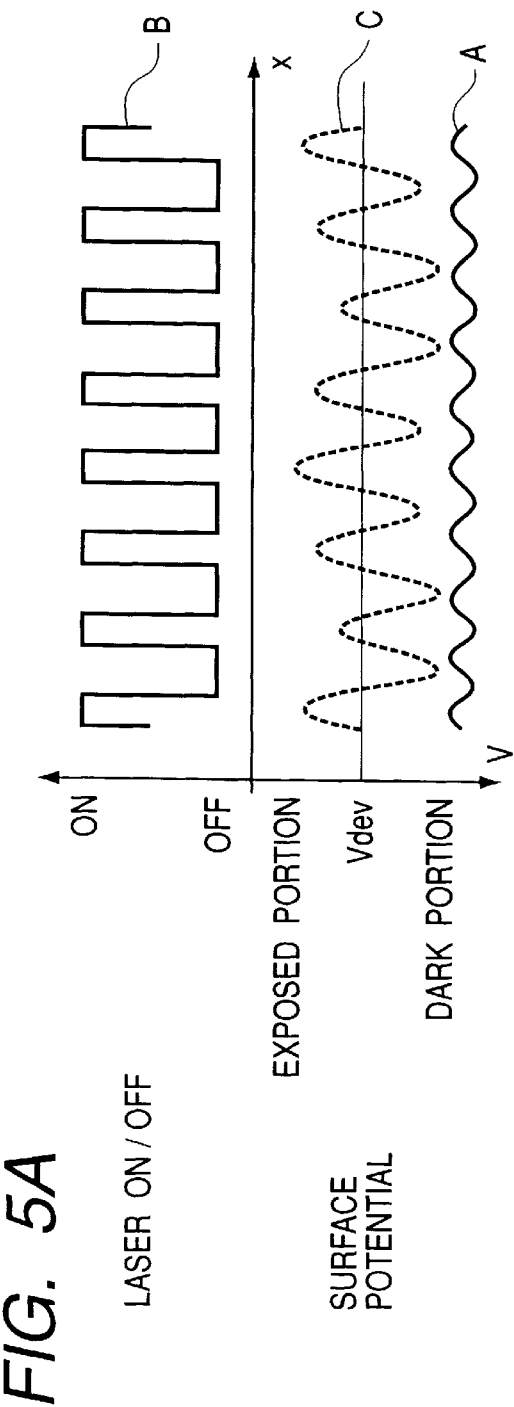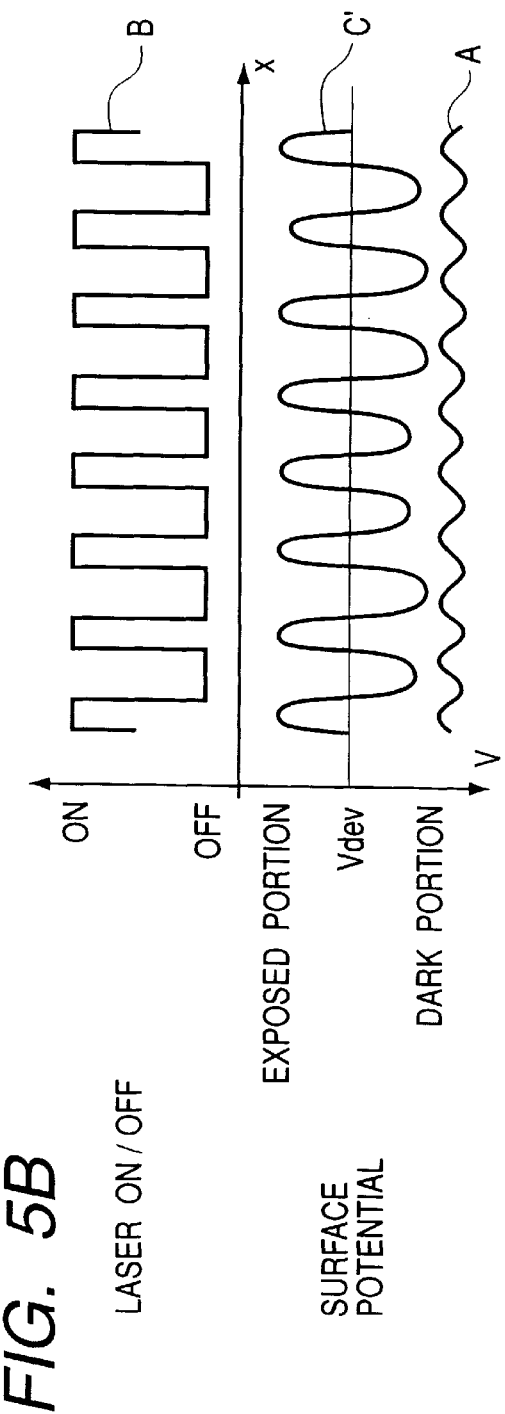
FIG. 5A
FIG. 5B

IMAGE FORMING APPARATUS HAVING A PHOTOSENSITIVE MEMBER BEARING AN ELECTROSTATIC LATENT IMAGE WHOSE PIXEL DENSITY CAN BE CHANGED

BACKGROUND OF THE INVENTION

1. Field of the Invention

This invention relates to an image forming apparatus such as a copying apparatus or a laser printer using, for example, the electrophotographic system or the electrostatic recording system, and a cartridge.

2. Related Background Art

In recent years, image forming apparatuses utilizing an electrophotographic system, such as copying apparatuses, laser beam printers and LED printers, have been widely used. Particularly with the recent spread of personal computers, inexpensive and compact image forming apparatuses have been desired as page printers for personal use.

At present, however, image forming apparatuses of this kind cannot be said to be sufficiently satisfactory in term of the quality of the produced image, and a higher quality of image is desired. As one means for satisfying such a requirement, there is desired an image forming apparatus improved in resolution, that is, provided with a high pixel density of 600 and 1200 dpi and further, 2400 dpi or greater.

On the other hand, in order to cope with diversified types of printing, the demand for an apparatus that can change over pixel density with a single image forming device to obtain an optimum image, depending on the purpose of printing, is heightening.

In such an apparatus, there is known a method of changing over the spot diameter of an exposure beam (the diameter for which the output of the exposure beam becomes $1/e^2$ of a maximum value) to thereby change over the pixel density.

However, when the spot diameter is made small in accordance with the need for high resolution, the proper spot diameter is, for example, about 40 μm for 600 dpi, and about 20 μm for 1200 dpi. To achieve such small spot diameters, a highly accurate aperture mechanism is required and further, as the spot diameter becomes smaller, the depth of focus of the exposure beam becomes shallower and therefore, a highly accurate optical system becomes necessary to form an image on a latent image bearing member, and a great increase in cost has become unavoidable.

So, as a method of changing over the pixel density without any increase in the cost of the optical system, there is a method of changing over the light amount of the exposure beam without changing the spot diameter. In the case of this method, the changeover of the light amount of the exposure beam can be done simply by changing the driving current of a light emitting element, and it is possible to change over the pixel density without increasing the cost in particular.

However, when the light amount is changed over by the use of a conventional photosensitive drum, if the light amount is adjusted so that the line width may become proper, there has arisen the problem that a small dot image, formed by one to several dots during high resolution, i.e., when the light amount set is small, is not reproduced.

FIG. 7 of the accompanying drawings is a graph showing the relations among the light amount distribution of the exposure beam, the sensitivity characteristic of the drum and an electrostatic latent image formed on the photosensitive drum. The first quadrant is the light amount distribution of the exposure beam, and the axis of the abscissas thereof represents the position, and the axis of the ordinates thereof represents the light amount. The second quadrant is the sensitivity characteristic of a popular photosensitive drum, and the axis of the ordinates thereof represents the light amount, and the axis of the abscissas represents the potential of the photosensitive drum. The third quadrant is the potential distribution of an electrostatic latent image projected with the sensitivity characteristic of the photosensitive drum added to the light-amount distribution of the exposure beam, and the axis of the abscissas thereof represents the potential and the axis of the ordinates represents the position.

A description will hereinafter be made of a case where the changeover of the resolution is set so as to change over, for example, at 600 dpi and 1200 dpi, and during 1200 dpi, the light amount of the exposure beam is set to about a half of that during 600 dpi.

The size of the electrostatic latent image to be developed must be substantially proportional to the size of a pixel determined by the resolution, and this condition can be satisfied by setting the developing bias to the potential of Vdev. In this setting, however, the developing contrast during 1200 dpi is very small and the latent image is hardly developed.

Also, when a half tone by lateral lines is printed by an image forming apparatus using a charging device for applying an AC bias to thereby charge the surface of a photosensitive drum, if the frequency of the bias is low to a certain extent, the period of the bias and the period of the lateral lines interfere with each other, whereby belt-like light and shade on an image (hereinafter referred to as the Moiré) occur.

Accordingly, at a high pixel density, such as 1200 dpi, the frequency of the charging bias is preset to a high level and the moiré can be made practically unseen, but if the frequency is made high, electrical damage to the surface of the drum will increase and the amount of scraping will become great.

SUMMARY OF THE INVENTION

The present invention has been made in order to solve the above-noted problems peculiar to the prior art and the object thereof is to provide an image forming apparatus and a process cartridge which make the changeover of pixel density in a single image forming apparatus possible at a low cost, and make it possible to improve the reproducibility of a small dot image during the setting of high a pixel density and to reduce the amount of scraping by the charging of an electrostatic latent image bearing member.

BRIEF DESCRIPTION OF THE DRAWINGS

FIGS. 5A and 5B are graphs illustrating a mechanism according to a third embodiment of the present invention.

DESCRIPTION OF THE PREFERRED EMBODIMENTS (Embodiment 1)

Figure 3:
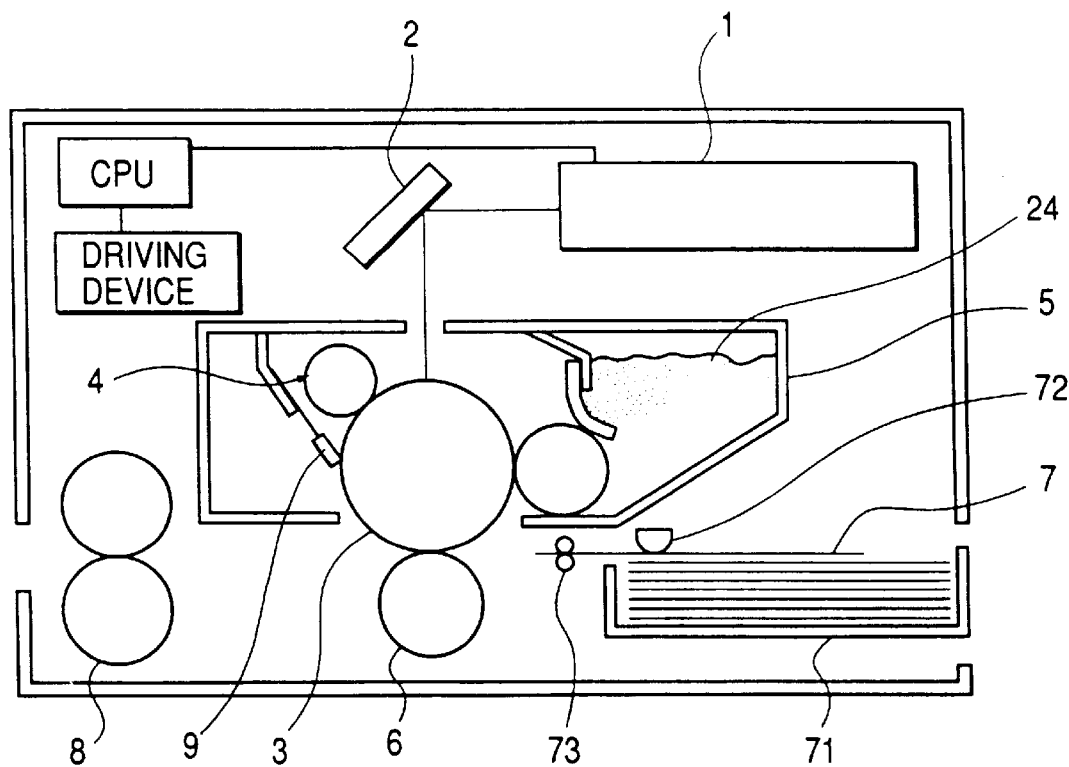
FIG. 3 is a schematic cross-sectional view of an image forming apparatus body according to the first embodiment.

The details of a first embodiment of the present invention will hereinafter be described with reference to the accompanying drawings. Referring to FIG. 3, which schematically shows the construction of an image forming apparatus according to the present embodiment, a laser beam modulated in conformity with an image signal is scan-outputted from a scanner unit 1 as exposure means including a laser, a polygon mirror, and a lens system, and this laser beam is reflected by a mirror 2 and is applied onto a photosensitive drum 3, which is an electrostatic latent image bearing member.

The photosensitive drum 3 is uniformly charged by a primary charger 4 comprising a charging roller as charging means, and an electrostatic latent image is formed on the surface thereof by the application of the laser beam. This electrostatic latent image is developed as a toner image by a toner 24 in a developing device 5 as developing means.

On the other hand, a recording material 7 contained in a cassette 71 is supplied to register rollers 73 by a paper supplying roller 72 in synchronism with the formation of the latent image on the photosensitive drum 3. This recording material 7 is conveyed to a transfer charger 6 comprising a transfer roller by the register rollers 73 in synchronism with the leading end of the latent image formed on the photosensitive drum 3, and the aforementioned toner image is transferred to the recording material 7 by the transfer charger 6.

The recording material 7 to which the toner image has been transferred has the toner image thereon permanently fixated by a fixating device 8, whereafter it is finally discharged out of the apparatus. Any toner residual on the photosensitive drum 3 is removed by a cleaning device 9 comprising an elastic blade.

The change of pixel density will now be described. The change of-pixel-density is effected by pixel density changing means, not shown, in accordance with a control command sent from a host computer. The control command is judged by a CPU in the image forming apparatus body, and changeover is done waiting for a print awaiting state. The changeover signal is sent to the driving device and exposure device 1 of the apparatus body, and the process-speed by process speed changing means and the amount of laser light as the exposure-intensity by exposure-intensity changing means are changed over, and the changeover of pixel density becomes effective during the next printing operation.

The pixel-density changing means is not particularly limited if it is a means which can change the pixel density. In the case of a method whereby exposure means rotates a polygon mirror to thereby cause a laser beam to scan, there is available a method of changing the number of revolutions of the polygon mirror to thereby change the pixel density, or a method of changing the process speed to thereby change the pixel density.

As the procedure of changing the pixel density, there is also a method of providing a switch or the like in the image forming apparatus body, but a method of changing the pixel density by the soft command of the host computer is desirable for the simplicity of operation and the prevention of a wrong operation.

The exposure-intensity changing means is not particularly limited if it is a means which can change the exposure intensity. When the exposure light source is a laser, there is available a method of changing a driving current applied during the emission of a laser beam, a method of changing the turn-on pulse width of the laser, or a method of inserting a filter between a laser source and the photosensitive drum, and when the exposure light source is one like a pigment laser whose wavelength is variable, there is available a method of changing the wavelength of emitted light to thereby change the exposure intensity.

It is desirable that these exposure-intensity changing means operate in operative association with the pixel-density changing means and be changed to the preset exposure intensity corresponding to each pixel density at a point in time which each pixel density has been selected.

The feature of the present invention is that in an image forming apparatus wherein exposure-intensity is changed over, whereby the changeover of pixel density can be accomplished by a single image forming apparatus, use is made of an electrostatic latent image bearing member in which the sensitivity measured by the NESA method is 2000 $(V \cdot cm^2/\mu J)$ or greater.

Here, the measurement of the sensitivity by the NESA method has been obtained from the light amount ($\Delta 500$) when a photosensitive laser formed on NESA glass is charged to $-700$ (V), whereafter light of a wavelength 700 (nm) is applied under an environment of 23° C. to provide $-200$ (V).

By using the aforedescribed electrostatic-latent-image bearing member, it becomes possible to form a sufficiently deep latent image even when the light amount is small and therefore, it becomes possible to maintain the reproducibility of a small dot image even if the light amount is made small to change over the pixel density by a single image forming apparatus.

Figure 1:
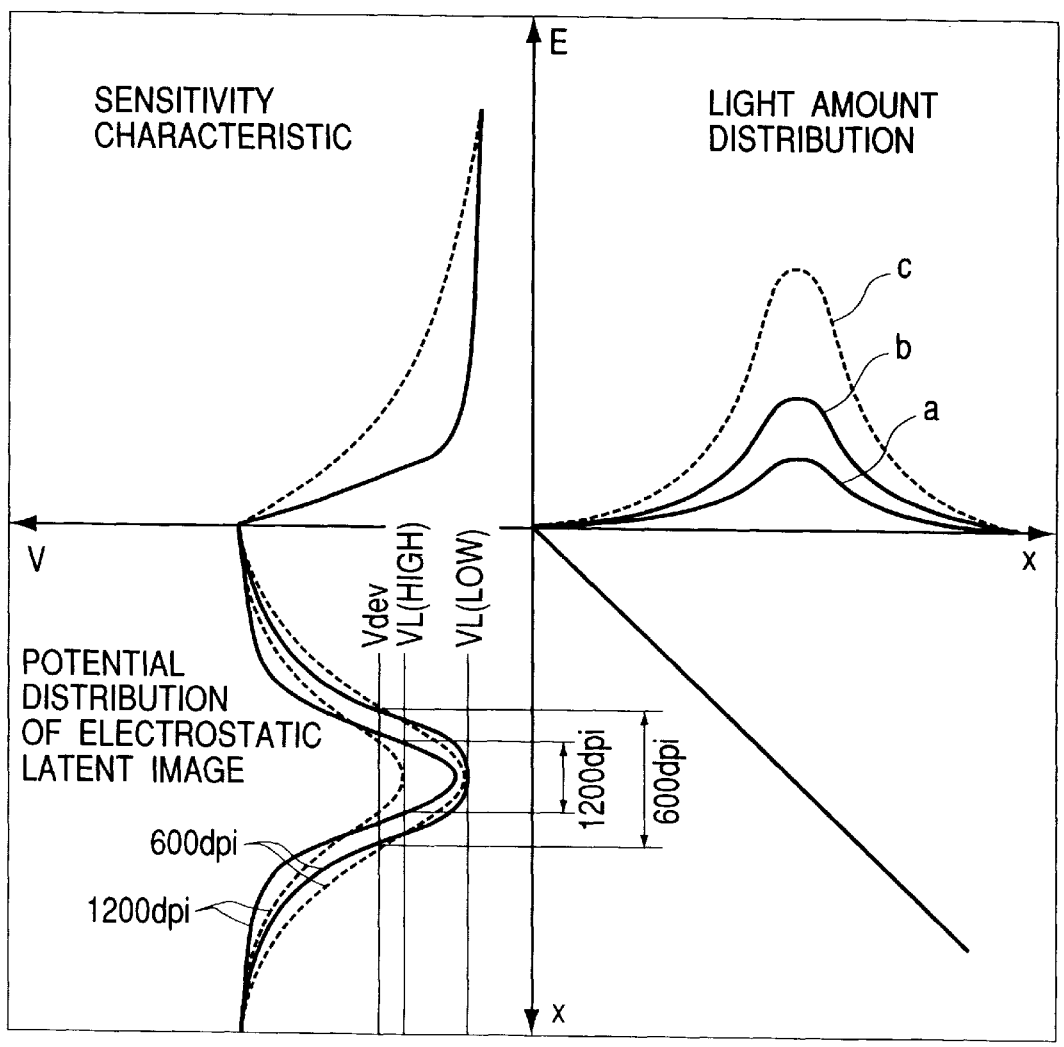
FIG. 1 is a graph illustrating a mechanism according to a first embodiment of the present invention.

A description will hereinafter be made with reference to FIG. 1. FIG. 1 is a graph showing the relations among the light-amount distribution of the exposure beam, the sensitivity characteristic of the drum, and the electrostatic latent image formed on the photosensitive drum. The first quadrant is the-light-amount distribution of the exposure beam, and the axis of the abscissas thereof represents a position x and the axis of the ordinates thereof represents the light amount E. The second quadrant is the sensitivity characteristic of the photosensitive drum, and the axis of the ordinates thereof represents the light amount E and the axis of the abscissas thereof represents the potential V of the photosensitive drum. The third quadrant is the potential distribution of the electrostatic latent image projected with the sensitivity characteristic of the photosensitive drum added to the light-amount distribution of the exposure beam, and the axis of the abscissas thereof represents the potential V and the axis of the ordinates represents the position x.

In the following, a description will be provided of a case where the changeover of resolution is set so as to change over the resolution, for example, at 600 dpi and 1200 dpi and the light amount a of the exposure beam during 1200 dpi is set to about a half of the light amount b during 600 dpi so that the size of the electrostatic latent image formed on the photosensitive drum may be nearly a half of that during 600 dpi when the pixel density is 1200 dpi.

Here, the size of the latent image is an area which contributes to development, and the size at developing bias Vdev. For comparison, the sensitivity characteristic of the prior-art photosensitive drum and the state of the latent image thereon are indicated by dotted lines. The sensitivity differs between the drum of the present invention and the prior-art drum and therefore, in the prior-art drum, the light amount b during 1200 dpi is indicated as b and the light amount during 600 dpi is indicated as c so that the line widths may be substantially the same.

According to the second quadrant, the photosensitive drum of the present invention is sufficiently high in sensitivity at a certain light amount or greater and therefore, it is possible to drop the surface potential sufficiently at a small light amount as compared with the prior-art photosensitive drum. When a light amount of a constant value determined by the photosensitive drum or greater is exposed, the surface potential assumes a constant value substantially equal to the residual potential of the photosensitive drum.

Next, according to the third quadrant, the latent image when the prior-art drum is used is such that in the case of a great light amount, the potential at the center of exposure becomes VL (low), and the developing contrast Δ (Vdev-VL (low)) has a sufficiently great magnitude for the development by the developer. On the other hand, in the case of a small light amount, the potential at the center of exposure becomes VL (high), and the developing contrast Δ (Vdev-VL (high)) is very small and the development by the developer cannot be effected sufficiently.

In contrast, when the photosensitive drum 3 according to the present embodiment is used, the potential is in the vicinity of VL (low), irrespective of a great light amount or a small light amount, and the developing contrast can be made sufficiently great.

The above-described effect remarkably appears when the spot diameter D ($\mu$m) of the exposure beam (D: the diameter for which the output of the exposure beam is $1/e^2$ of the maximum value) is two to eight times, particularly, three to five times as large as the theoretical size of a pixel found from the settable maximum pixel density by calculation.

That is, when changeover to 600 dpi and 1200 dpi is possible, the theoretical size of a pixel during 1200 dpi is 20 $\mu$m, and a great effect is obtained when the spot diameter of the exposure beam is 40 to 160 $\mu$m (20×2 to 20×8).

Figure 2:
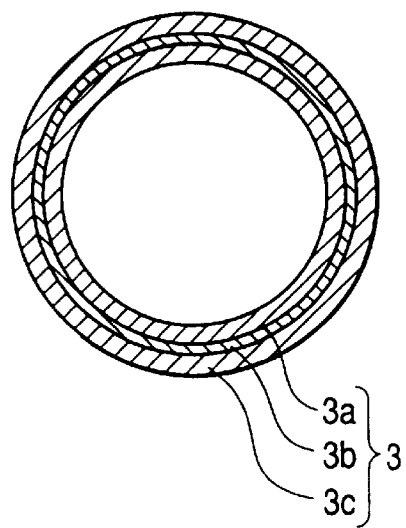
FIG. 2 is a schematic cross-sectional view of a photosensitive drum according to the first embodiment.

The details of the photosensitive drum 3 according to the present embodiment will now be described with reference to FIG. 2. The drum 3 is formed by a-charge-generating layer 3b and a charge-transporting layer 3c being successively laminated on an electrically conductive substrate 3a.

The electrically conductive substrate 3a is a metal, such as aluminum, chromium, nickel, copper or stainless steel formed into a drum or a sheet, or metallic foil laminated on plastic film.

The charge-generating layer 3b is formed by dispersing a charge-generating material, such as titanilphthalocyanine pigment in binding resin such as polyvinyl butyral, polystyrene, polyvinyl acetate, acryl resin or ethyl cellulose, and applying this dispersed liquid by coating or vacuum-evaporating the aforementioned pigment. The film thickness of the charge-generating layer 3b is 5 $\mu$m or less, and preferably 0.05 to 3 $\mu$m.

The charge-transporting layer 3c is formed by the use of coating liquid composed of a charge-transporting substance, such as a polynuclear aromatic compound having the structure of biphenylene, anthracene, pyrene, phenanthrene or the like in the principal chain or the side chain, a nitrogen-containing nuclear compound such as indole, carbazole, oxadiazole or pyrazoline, a hydrazone compound or a styryl compound dissolved in resin having a film forming property. As such resin, mention may be made of polyester, polycarbonate, polystyrene polyester methacrylate or the like.

The thickness of the charge-transporting layer 3c may be 5 to 40 $\mu$m, and preferably 10 to 30 $\mu$m. The charge transporting material may be used singly or may be used while being mixed with other charge-transporting material.

However, the photosensitive drum 3 used in the present invention is not particularly restricted to the above-described construction if the NESA sensitivity thereof is 2000 (V·cm$^2$/$\mu$J) or greater, but is free, for example, as to the presence or absence of a surface protecting layer.

A specific example will hereinafter be described. The photosensitive drum 3 used in the present invention comprises an aluminum cylinder of 30 φ×260 mm as a base body, and 4 parts of copolymerized nylon were dissolved in 50 parts of methanol and 50 parts of butanol and were applied onto the support member, whereby an underlayer of 0.6 $\mu$m was formed. Next, 30 parts of methyl ethyl ketone were added to dispersion liquid in which 10 parts of titanilphthalocyanine pigment and 10 parts of polyvinyl butyral resin were dispersed with 120 parts of cyclohexanone for ten hours by a sand mill apparatus, and were applied to the underlayer to thereby form a charge-generating layer having a thickness of 0.15 $\mu$m.

Next, 10 parts of polycarbonate resin of weight average molecular weight 120,000, with 10 parts of hydrazone compound, were dissolved in 80 parts of monochlorbenzen, and were applied onto the charge generating layer to thereby form a charge-transporting layer having a thickness of 10 $\mu$m. The NESA sensitivity of the thus obtained photosensitive drum was 2500 (V·cm$^2$/$\mu$J).

As a prior-art photosensitive drum for comparison, use was made one using azo pigment for the charge generating layer. The NESA sensitivity of this photosensitive drum was 500 (V·cm$^2$/$\mu$J).

Table 1 below shows the results of the surface potential, the line width and the one-dot reproducibility of the exposed portion when a laser beam was applied to these photosensitive drums.

TABLE 1

| pixel density (dpi) | light amount ($\mu$J/cm$^2$/2) | present invention | | | prior art | | |
| --- | --- | --- | --- | --- | --- | --- | --- |
| | | surface potential (V) | line width ($\mu$m) | dot reproducibility | surface potential (V) | line width ($\mu$m) | dot reproducibility |
| 600 | 0.35 | 150 | 180/4 dot | A | 160 | 180/4 dot | B |
| 1200 | 0.2 | 160 | 170/8 dot | B | 240 | 150/8 dot | C |

(A: very good, B: good, C: bad)

In both cases, the spot diameter Δ ($\mu$m) of the exposure beam (D: the diameter for which the output of the exposure beam is $1/e^2$ of the maximum value) was 80 ($\mu$m), the surface potential of the exposed dark portion was −700 (V), and the developing bias was −500 (V).

As described above, by using the photosensitive drum 3 according to the present embodiment, it becomes possible to form a sufficiently deep latent image even when the light amount is small and therefore, even if the light amount is made small to change over the pixel density by a single image forming apparatus, it becomes possible to maintain the reproducibility of a small dot image.

(Embodiment 2)

A second embodiment of the present invention will now be described. The feature of the present embodiment is that use is made of a developing device in which the weight average grain diameter of the developer is equal to or larger than 3.5 µm and equal to or smaller than 7.0 µm and the developer amount W formed as a layer on the developer carrying member (W: the developer weight (mg) per 1 (cm$^2$) of the surface of the developer carrying member) is 0.6≦W≦1.5.

By using a fine grain diameter developer having a weight average grain diameter of 3.5 to 7.0 µm, the grain diameter of the developer is sufficiently smaller with respect also to an isolated pixel of high pixel density and therefore, sufficient resolving power is provided.

Also, the developer amount W formed as a layer on the developer carrying member (W: the developer weight (mg) per 1 (cm$^2$) of the surface of the developer carrying member) is 0.6≦W≦1.5, whereby the developing capability of individual developers can be enhanced and therefore, sufficient development can be effected even to a latent image in a minute area and a uniform and stable developer layer can be formed on the developer carrying member.

The developer is not otherwise limited if the weight average grain diameter thereof is equal to or larger than 3.5 µm and equal to or smaller than 7.0 µm. Also, a charge-controlling agent and other various additives may be added, irrespective of magnetism, non-magnetism, one component and two components.

The construction of the developer-carrying member is neither particularly limited. Use can be made of one made of a metal and a resin layer containing electrically conductive particles provided on the surface of the metal, one comprising electrically conductive resin or the like molded into a cylindrical shape or film, or one comprising electrically conductive rubber molded into a roll-like shape.

The developer-regulating member is not particularly limited if it can regulate the developer amount W formed as a layer on the developer-carrying member (W: the developer weight (mg) per 1 (cm$^2$) of the surface of the developer carrying member) to 0.6≦W≦1.5. For example, use can be made of a method of bringing an elastic blade formed of rubber, a metallic thin plate or a rubber layer provided in the form of a metallic thin plate into contact with the-developer-carrying member with a toner interposed therebetween.

Figure 4:
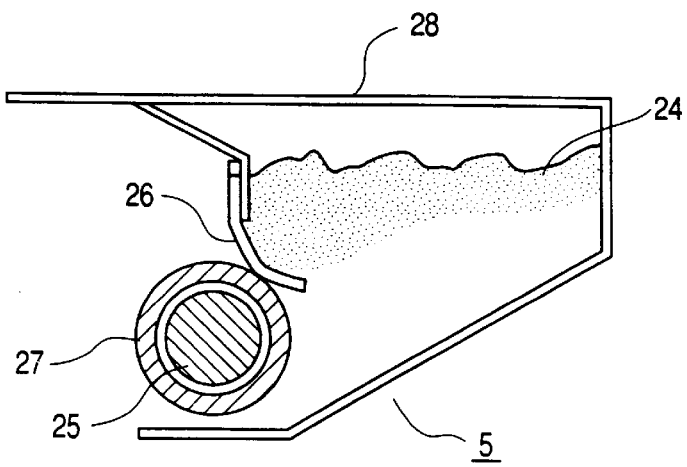
FIG. 4 is a schematic cross-sectional view of the essential portions of an image forming apparatus according to a second embodiment of the present invention.

A specific example will hereinafter be described with reference to FIG. 4. The toner 24 used as the developer was a negatively chargeable magnetic one-component toner having a weight average grain diameter 5 µm.

A developing sleeve 25 as the developer-carrying member was a non-magnetic aluminum sleeve having its surface coated with a resin layer containing electrically conductive particles and having surface roughness Ra=1.0 µm.

A blade 26 as the developer-regulating member was a blade member formed of silicone rubber of rubber hardness 40° (JIS-A) and disposed so as to bear against the developing sleeve 25 with a bearing force P (bearing load gf/cm per 1 cm with respect to the lengthwise direction of the developing sleeve 25) of 40 (gf/cm).

Also, the bearing width (nip) between the developing sleeve 25 and the blade 26 is 1.0 (mm), and the distance from the most upstream bearing position (the upstream position with respect to the direction of rotation of the sleeve) to the free end of the blade is 2.0 (mm).

The developing sleeve 25 is provided with a magnet roll 27. The toner 24 is in a developing container 28, and is sent to the vicinity of the developing sleeve 25 by agitation, whereafter it is supplied to the developing sleeve 25 by the action of a magnetic field formed by the magnet roll 27, and is conveyed with the rotation of the developing sleeve 25.

Thereafter, the toner is subjected to-tribo-imparting and layer-thickness regulation in the portion of contact with the blade 26 and is conveyed to a developing area. In the present embodiment, the toner amount W on the developing sleeve 25 was W=1.2 (W: the toner weight (mg) per 1 (cm$^2$) of the surface of the sleeve).

A vibration voltage comprising an alternating current superposed on a direct current is applied from a voltage source, not shown, to the developing sleeve 25 to thereby form a developing electric field between the developing sleeve and the photosensitive drum, and the development of an electrostatic latent image is effected in accordance with the electric field. A developing bias comprising a DC voltage: Vdc=−500 (V) and an AC voltage: rectangular wave, Vpp=1600 (V), f =1800 (Hz) superposed one upon the other is applied to the developing sleeve.

The developing sleeve 25 and the photosensitive drum 3 are opposed to each other keeping a gap of 300 (µm) in their most proximate position. The photosensitive drum 3 is uniformly charged to charging potential Vd=−700 (V) and is exposed to a laser in accordance with an image signal and that portion thereof assumes about VL=−150 (V). The VL portion is reversely developed by a negatively chargeable toner.

Table 2 below shows the result of the dot reproducibility when the present embodiment was used. For comparison, as a prior-art developing device, use was made of one using a toner of weight average grain diameter 8 µm and in which the contact pressure of the developer-regulating member was adjusted to thereby provide a toner amount W=2.0 (mg/cm$^2$) on the sleeve.

TABLE 2

| pixel density (dpi) | light amount (µJ/cm$^2$2) | surface potential (V) | present invention | | prior art | |
| --- | --- | --- | --- | --- | --- | --- |
| | | | line width (µm) | dot reproducibility | line width (µm) | dot reproducibility |
| 600 | 0.35 | 150 | 180/4 dot | A | 180/4 dot | A |
| 1200 | 0.2 | 160 | 180/8 dot | A | 170/8 dot | B |

(A: very good, B: good)

As described above, by using the developing means according to the present embodiment, sufficient development can be effected even to a latent image in a minute area and therefore, it becomes possible to maintain the reproducibility of a small dot image even if the light amount is made small to change over the pixel density by a single image forming apparatus.

(Embodiment 3)

A third embodiment of the present invention will now be described. The feature of the present embodiment is that in an image forming apparatus wherein the pixel density can be changed over to a plurality of pixel densities by a single image forming apparatus and which uses an exposure beam of the same diameter irrespective of the changeover of the pixel density, when the ratio between "the spot diameter of the exposure beam" and "the theoretical size of a pixel found from the pixel density by calculation" (hereinafter referred to as the spot ratio) is above and below 2.5, the frequency f (Hz) of the charging bias is brought into the following relation:

$$f(H)=\alpha \times ((v(H) \times r(H))/(v(L) \times r(L))) \times f(L) \quad 0.6 \leq \alpha \leq 0.8$$

where v: process speed (mm/sec.)
r: resolution (dpi)
in both, (H): when the spot ratio is equal to or greater than 2.5 (high pixel density)
(L): when the spot ratio is less than 2.5 (low pixel density).

If in an image forming apparatus using a charging device in which an AC bias is applied to thereby charge the surface of a photosensitive drum, a half tone by lateral lines is printed, when the frequency of the bias is low to a certain extent, the period of the bias and the period of the lateral lines interfere with each other to thereby create belt-like light and shade on an image (hereinafter referred to as the Moiré).

Further describing the interview with reference to FIG. 5A, the surface potential of the photosensitive drum charged by the use of an AC bias is minutely fluctuating at the period of the AC bias as indicated by line A. If an attempt is made to form a latent image indicated by line B on this surface, the period of the bias and the period of the latent image interfere with each other, and undulation is created in the resultant electrostatic latent image as indicated by line C, and the line width contributing to development fluctuates. When this electrostatic latent image is developed, it appears as light and shade conforming to the fluctuation of the line width.

This Moiré can be made practically unseen by heightening the frequency of the charging bias, but when the frequency is heightened, electrical damage to the surface of the drum increases and the amount of scraping becomes great.

So, by using the photosensitive drum according to the first embodiment of the present invention, it becomes possible to form a deep latent image of a shape approximate to a rectangular wave even when the spot ratio is equal to or greater than 2.5 (high pixel density), and it becomes possible to make the fluctuation of the line width into a problem-free level as indicated by line C' in FIG. 5B.

When an image was actually formed by the use of an image forming apparatus of a spot diameter 60 μm, Moiré did not occur, although the frequency of the charging bias was 1000 Hz when the resolution was 600 dpi and the process speed was 100 mm/sec. and although the frequency of the charging bias was 700 Hz when the resolution was 1200 dpi and the process speed was 50 mm/sec.

The amount of scraping of the drum per 1000 sheets of prints during 1200 dpi was 1.2 μm, which was substantially equal to 1.1 μm during 600 dpi. In contrast, when the frequency of the charging bias was 1000 Hz during the setting of 1200 dpi, the amount of scraping became 1.8 μm, and by the present invention, the amount of scraping could be made smaller by 30% or greater.

When the factor α in the above-mentioned expression is 0.6, Moiré occurs, and when the factor α is 0.8 or greater, the effect of reducing the amount of scraping becomes smaller.

(Embodiment 4)

Figure 6:
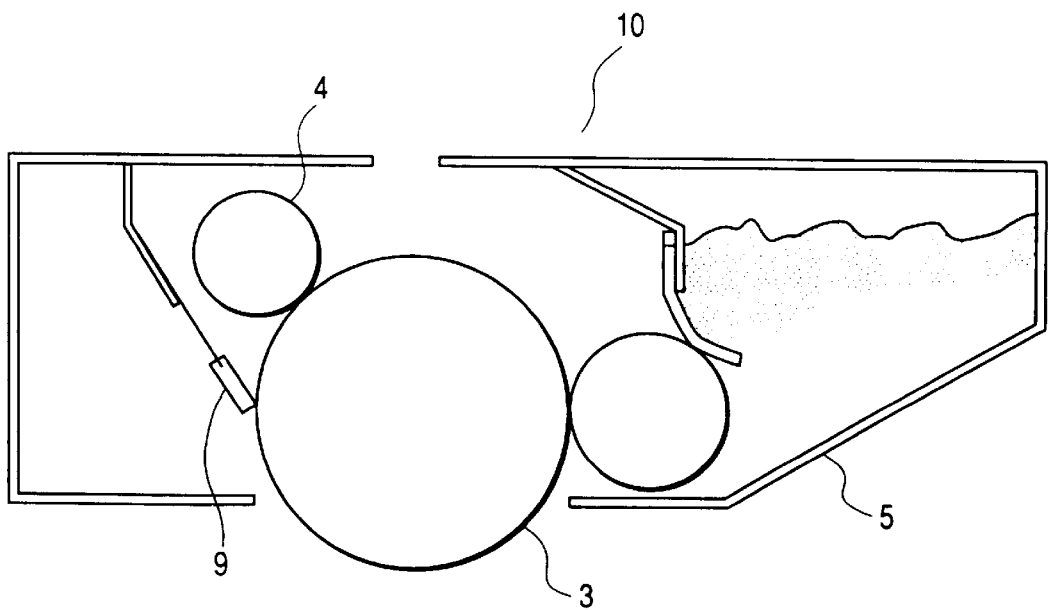
FIG. 6 is a schematic cross-sectional view of a process cartridge according to a fourth embodiment of the present invention.
Figure 7:
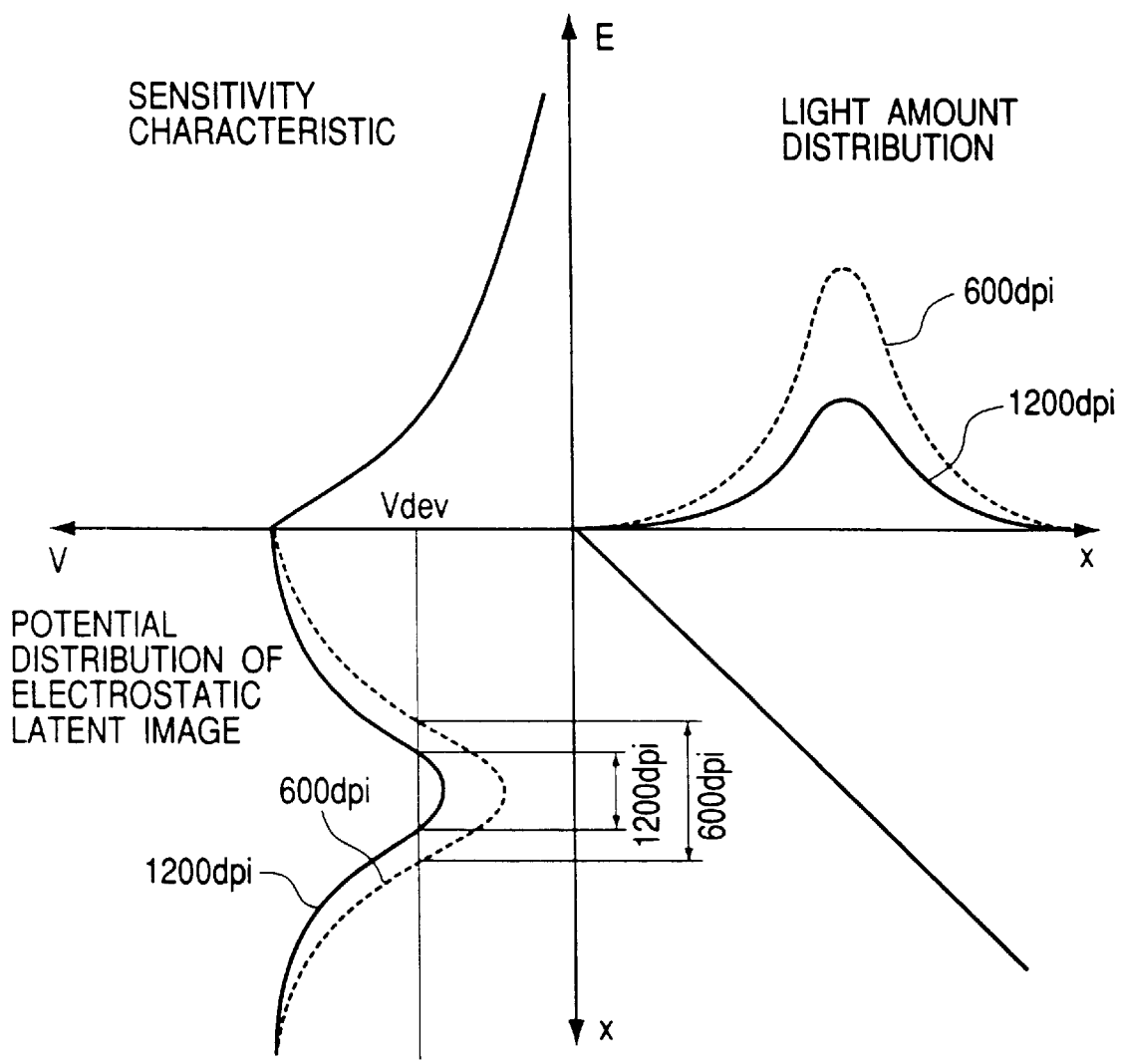
FIG. 7 is a graph illustrating a mechanism according to the prior art.

The schematic construction of a process cartridge according to a fourth embodiment of the present invention will now be described with reference to FIG. 6. The process cartridge 10 comprises the photosensitive drum 3, the charging roller 4, the developing device 5 and the cleaning device 9 described in the first embodiment, which are collectively made into a unit.

These constituents are assembled in the process cartridge 10 with a predetermined mutual arrangement relation, and the process cartridge 10 can be inserted into and removed from a predetermined portion in the image formatting apparatus body in a predetermined manner.

As the image forming apparatus is used for a long time, the elements such as the photosensitive drum, the charging device, the developing device and the cleaning device are consumed to thereby deteriorate the quality of printing, but in that case, a user can suitably interchange the process cartridge, and the user's maintenance-free system can be realized.

As described above, it becomes possible to maintain the reproducibility of a small dot image well even if the light amount of the exposure means is made small to change over the pixel density by a single image forming apparatus and form a latent image of high pixel density on the electrostatic latent image bearing member.

According to the electrostatic latent image bearing member to which the present invention is applied, it becomes possible to make the developing contrast into a value sufficient to make development of high quality possible irrespective of the exposure intensity of the exposure means.

Also, according to the developing means to which the present invention is applied, good development can be effected even for a latent image in a minute area.

By making the frequency of the charging bias low, it becomes possible to reduce electrical damage to the electrostatic latent image bearing member, and the service life of the electrostatic latent image bearing member can be lengthened and also, image formation of high quality can be maintained for a long period.

Also, by the process cartridge provided with the electrostatic latent image bearing member or the developing means to which the present invention is applied, stable image formation can be effected and the maintenance property is also improved.

What is claimed is:

1. An image forming apparatus comprising:
   a photosensitive member for bearing an electrostatic latent image thereon;
   charging means for charging a surface of said photosensitive member;
   image exposure means for exposing the surface of said photosensitive member on the basis of image information;
   developing means for visualizing the electrostatic latent image by a developer;
   pixel density changing means for changing a pixel density of the electrostatic latent image to a different set value; and
   exposure intensity changing means for changing an exposure intensity of said image exposure means in conformity with the set value of the pixel density;
   wherein said photosensitive member is 2000 (V·cm²/μJ) or larger in sensitivity.

2. An image forming apparatus according to claim 1, wherein said image exposure means scans the surface of said photosensitive member by a laser beam conforming to the image information, and said exposure intensity changing means sets the exposure intensity of the laser beam so as to make the spot ratio which is the ratio of the spot diameter of an exposure beam to the size of a pixel not less than 2.5 in high pixel density, and to make said spot ratio not more than 2.5 in low pixel density.

3. An image forming apparatus according to claim 1 or 2, wherein said charging means is provided with a charging member for charging the surface of said photosensitive member, and power source means for applying a charging bias comprising an AC bias superimposed on a DC bias to said charging member, and when the frequency of the charging bias is defined as f(Hz), the process speed is defined as V(mm/sec.) and the resolution is defined as r(dpi), and when (H) is suffixed to a symbol, the combination of (H) and the symbol refers to the value of that symbol in the case of high pixel density and when (L) is suffixed to a symbol, the combination of (L) and that symbol refers to the value of that symbol in the case of low pixel density, and wherein the frequency f of said charging bias satisfies the relation of $$f(H)=\alpha \times (v(H) \times r(H)/(v(L) \times r(L))) \times f(L),$$

where $0.6 \leq \alpha \leq 0.8$.

4. An image forming apparatus comprising:

a photosensitive member for bearing an electrostatic latent image thereon;

charging means for charging a surface of said photosensitive member, image exposure means for exposing the surface of said photosensitive member on the basis of image information to thereby form an electrostatic latent image;

developing means for visualizing the electrostatic latent image by a developer;

pixel density changing means for changing a pixel density of said electrostatic latent image to a different set value; and exposure intensity changing means for changing an exposure intensity of said exposure means in conformity with the set value of the pixel density;

wherein said developing means is provided with a developer, a developer bearing member disposed in opposed relationship with said photosensitive member, and a developer regulating member abutted against said developer bearing member to regulate a thickness of a developer layer formed on the surface of said developer bearing member, wherein the weight average grain diameter of the developer is not less than 3.5 ($\mu$m) and not more than 7.0 ($\mu$m), and wherein a developer weight W(mg) of the developer layer formed on the surface of said developer carrying member per 1 cm$^2$ thereof is within the range of $0.6 \leq W \leq 1.5$.

\* \* \* \* \*

UNITED STATES PATENT AND TRADEMARK OFFICE
CERTIFICATE OF CORRECTION

PATENT NO.    : 6,219,076 B1
DATED         : April 17, 2001
INVENTOR(S)   : Hiroshi Sato It is certified that error appears in the above-identified patent and that said Letters Patent is hereby corrected as shown below:

Column 1,
Line 21, "term" should read -- terms --.

Column 2,
Line 35, "moire'" should read -- Moire' --.

Column 3,
Line 40, "of-pixel-density" should read -- of pixel density --; and "by pixel density" should read -- by pixel-density --.

Column 4,
Line 27, "electrostatic-latent-image" should read -- electrostatic latent-image --;
Line 39, "the-light-amount" should read -- the light-amount --; and
Line 61, "at developing" should read -- at a developing --.

Column 5,
Line 41, "a-charge-generating" should read -- a charge-generating --.

Column 7,
Line 45, "the-developer-" should read -- the developer --.

Column 8,
Line 18, "to-tribo-importing" should read -- to tribo-importing --.

Column 9,
Line 32, "interview" should read -- invention --.

Column 10,
Line 14, "formatting" should read -- forming --.

UNITED STATES PATENT AND TRADEMARK OFFICE
CERTIFICATE OF CORRECTION

PATENT NO. : 6,219,076 B1
DATED : April 17, 2001
INVENTOR(S) : Hiroshi Sato

It is certified that error appears in the above-identified patent and that said Letters Patent is hereby corrected as shown below:

Column 12,
Line 2, "member," should read -- member; --.

Signed and Sealed this

Eighteenth Day of February, 2003

JAMES E. ROGAN
*Director of the United States Patent and Trademark Office*